(12) United States Patent
Bever et al.

(10) Patent No.: US 7,346,489 B1
(45) Date of Patent: *Mar. 18, 2008

(54) SYSTEM AND METHOD OF DETERMINING PHRASING IN TEXT

(75) Inventors: Thomas G. Bever, Tucson, AZ (US); John Robbart, II, San Diego, CA (US)

(73) Assignee: Language Technologies, Inc., Tucson, AZ (US)

(*) Notice: Subject to any disclaimer, the term of this patent is extended or adjusted under 35 U.S.C. 154(b) by 73 days.

This patent is subject to a terminal disclaimer.

(21) Appl. No.: 11/431,725

(22) Filed: May 10, 2006

Related U.S. Application Data

(63) Continuation of application No. 09/615,163, filed on Jul. 13, 2000, now Pat. No. 7,069,508.

(60) Provisional application No. 60/144,368, filed on Jul. 16, 1999.

(51) Int. Cl.
*G06F 17/29* (2006.01)

(52) U.S. Cl. .............................. 704/4; 715/530; 715/531

(58) Field of Classification Search ...................... None
See application file for complete search history.

(56) References Cited

U.S. PATENT DOCUMENTS

| | | | |
|---|---|---|---|
| 5,164,899 A | 11/1992 | Sobotka | |
| 5,802,533 A | 9/1998 | Walker | |
| 5,937,420 A | 8/1999 | Karow | |
| 5,978,819 A | 11/1999 | Berstis | |
| 6,056,551 A | 5/2000 | Marasco | |
| 6,223,191 B1 * | 4/2001 | Truelson | 715/517 |
| 6,279,017 B1 | 8/2001 | Walker | |
| 6,292,176 B1 | 9/2001 | Reber | |
| 6,473,523 B1 | 10/2002 | Newman | |
| 6,510,441 B1 | 1/2003 | Kenninga | |

OTHER PUBLICATIONS

S. Jandreau et al "Improving the Readability of Text with Automatic Phrase-Sensitive Formatting", British Journal of Educational Technology, No. 2, vol. 17, May 1986, p. 128-133.

Thomas G. Bever "Spacing Printed Text to Isolate Major Phrases Improves Readability", Dept of Psychology, Meliora Hall, Univ of Rochester, p. 74-87, Visible Language, 25:1 1990.

Steven Jandreau and Thomas Bever, "Phrase-Spaced Formats Improve Comprehension in Average Readers" Journal of Applied Psychology 1992, vol. 77, No. 2, pp. 143-146.

* cited by examiner

*Primary Examiner*—David Hudspeth
*Assistant Examiner*—Eunice Ng
(74) *Attorney, Agent, or Firm*—Eric A Gifford

(57) ABSTRACT

A system analyzes text, determines phrasing and, in an exemplary embodiment, reformats the text to establish optimal spacing and related features for readability, reader comprehension and publishing economies. A neural network uses a library of text data to analyze text and determine phrases. Formatting emphasizes phrases using one or more of a plurality of techniques including word spacing, text darkness and controlling line breaks.

21 Claims, 4 Drawing Sheets

SYSTEM AND METHOD OF DETERMINING PHRASING IN TEXT

CROSS-REFERENCE TO RELATED APPLICATION

This application is a continuation of U.S. Utility application Ser. No. 09/615,163, filed Jul. 13, 2000 now U.S. Pat. No. 7,069,508 by the present inventors, entitled "System and Method for Formatting Text According to Linguistic, Visual and Psychological Variables" and claims priority under 35 USC 120, which itself claims benefit to priority under 35 USC 119(e) to U.S. Provisional Application No. 60/144,368 filed on Jul. 16, 1999.

FIELD OF THE INVENTION

This invention relates generally to display of text on a presentation device and more particularly to optimizing the arrangement and other physical aspects of the display of text for readability.

BACKGROUND OF THE INVENTION

The art of printing can enhance the legibility of text. Early block prints omitted spacing between words, punctuation, capitalization and other things now expected as part of formatted printed text. Conventions generally observed in typesetting, such as allowing spaces between words, special characters at the end of words, commas and periods convey linguistically relevant information about the text. Advances in the technology of desktop publishing have greatly enhanced the versatility with which printed matter can be formatted. A variety of fonts, precise kerning, variations in leading, column width and other parameters can be modified with ease, giving formatted text any desired appearance.

Linguistic research has enriched our knowledge of what the structure of language entails, and psycholinguistic research has explored which aspects of that structure play a role in language behaviors such as reading. The results of studies show that the intuitively defined "phrase" plays a significant role in normal language comprehension. The manner in which text is formatted can have a significant impact on the speed and comprehension with which it is read. Adjusting the spacing and other physical aspects of text to reflect patterns of speech assists a reader in absorbing the content of printed matter. During the last century, psychological research has elucidated a great deal of information about the visual processes involved in activities such as reading. The most significant discovery is that the visual system is blind when the eyes are actually in rapid motion. That is, that reading depends on a series of snapshots of the line of type. This constrains the optimal text display to be one in which phrases are equally dense, to aid the eye in concentrating on points of maximal information. It is desirable to have a device that formats text in a manner that focuses the reader's eye efficiently on the text.

In addition to readability, another problem addressed by the present invention is the presence of rivers. Formatted text can have rivers, i.e. streaks of white space in the text that detract from the aesthetics of the text presentation and in turn detract from readability. It remains desirable to have a method for formatting text appearing on paper and other media (e.g. video and computer display screens, LCD panels, etc.) for the greatest degree of readability.

It is an object of the present invention to provide a method and apparatus to increase the readability of text resolving the phrasing and other challenges to optimal readability.

It is another object of the present invention to provide a method and apparatus that reduces physical space needed for text display while maintaining the readability of the text.

It is another object of the present invention to provide a method and apparatus to enable a reader to increase the speed with which he or she can read text.

It is another object of the present invention to provide a method and apparatus to enable a reader to increase his or her comprehension and retention of text.

It is another object of the present invention to provide a method and apparatus that reduces the incidence of rivers in formatted text.

SUMMARY OF THE INVENTION

The present invention provides a system and method of determining phrasing in text.

The present invention analyzes text, determines phrasing and, in an exemplary embodiment, reformats the text to establish optimal spacing and related features for readability, reader comprehension and publishing economies. In a preferred embodiment, the invention has a neural network that uses a library of text data to analyze text and determine phrases. The text is then formatted according to the determined phrases. The neural network learns additional phrase indicators as it analyzes texts and adds the additional data to the library. Alternatively, an expert system can be established having rules and templates to be used for analyzing text or the neural network can be used to develop such an expert system. The formatting emphasizes phrases using one or more of a plurality of techniques including word spacing, text darkness and controlling line breaks.

The system of the present invention takes input from any one of a number of different types of devices such as a computer keyboard, a client computer, or a speech recognition device. The formatted text output can be used for a number of different types of reading material including printed books, electronic books, Web pages, direct mailing literature, and closed caption systems.

The present invention together with the above and other advantages may best be understood from the following detailed description of the embodiments of the invention illustrated in the drawings, wherein:

DETAILED DESCRIPTION OF PREFERRED EMBODIMENTS

The method and apparatus of the present invention take text as input, analyze the text, determine phrase boundaries in the analyzed text, assign values to spaces between words according to determined phrase boundaries, determine optimal characteristics for readability, and display the text accordingly.

Figure 1:
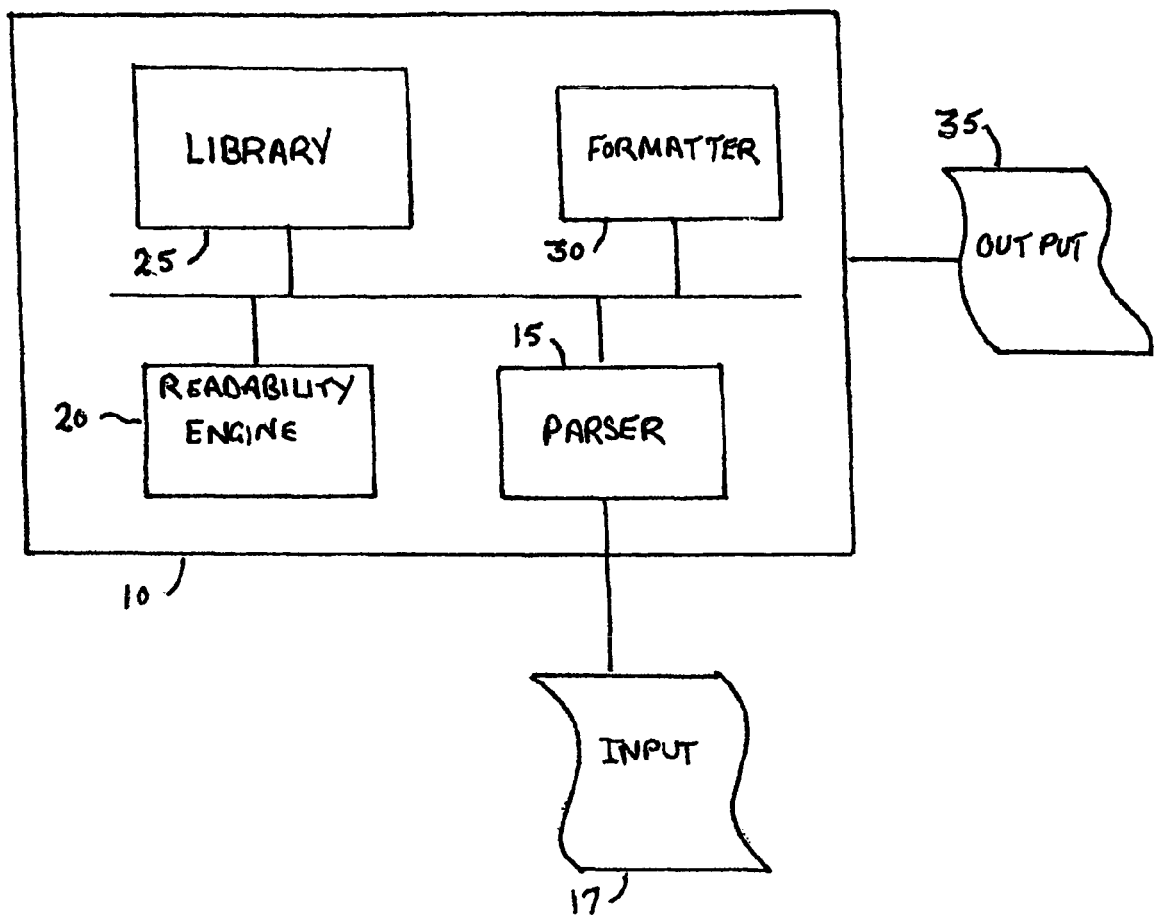
FIG. 1 is a block diagram of a text formatting system according to principles of the present invention.

FIG. 1 shows the text formatting system 10 of the present invention. The text formatting system 10 may be independent or may be included in a word processing system or a document layout system. In the text formatting system 10, a parser 15 takes input 17 from one or more sources. The sources may be a computer or telecommunications network input; a keyboard or other user input device such as a touch pad, an on-screen touch pad, a prosthetic device, a hand-writing recognition device; a speech recognition program; a thin client on a Web-based network; or any other source of text data including a computer application that generates text. The parser 15 identifies words and punctuation in the text stream from the input device. A readability engine 20 takes the words and punctuation as identified by the parser 15 and determines phrases. Phrases are defined as those portions of text after which pauses natural to the reader would occur were the text to be read aloud. Other types of phrasing are possible and the invention is not limited to the aforementioned definition. A library 25 contains data about text such as punctuation and key words identifying the beginning or end of a phrase which are used by the engine to identify phrases. In this preferred embodiment of the invention, the readability engine 20 is neural-network based and continues to train in extricating patterns from the text in order to determine phrases. A formatter 30 formats the text stream according to the phrase determinations made by the readability engine 20 and according to any additional rules stored in the library 25. The system 10 then sends the output 35 to one or more receiving devices, such as a printer, or a display screen, verbal output, or a closed-caption device, for television for example. The input and output devices listed here are merely exemplary and the invention is not limited to those devices listed here. In alternative embodiments of the invention, the formatter may be included in a printer rather than in the text formatting system. In further alternative embodiments, the formatter included in the system 10 performs preliminary formatting functions, and a printer performs subsequent formatting functions.

Figure 2:
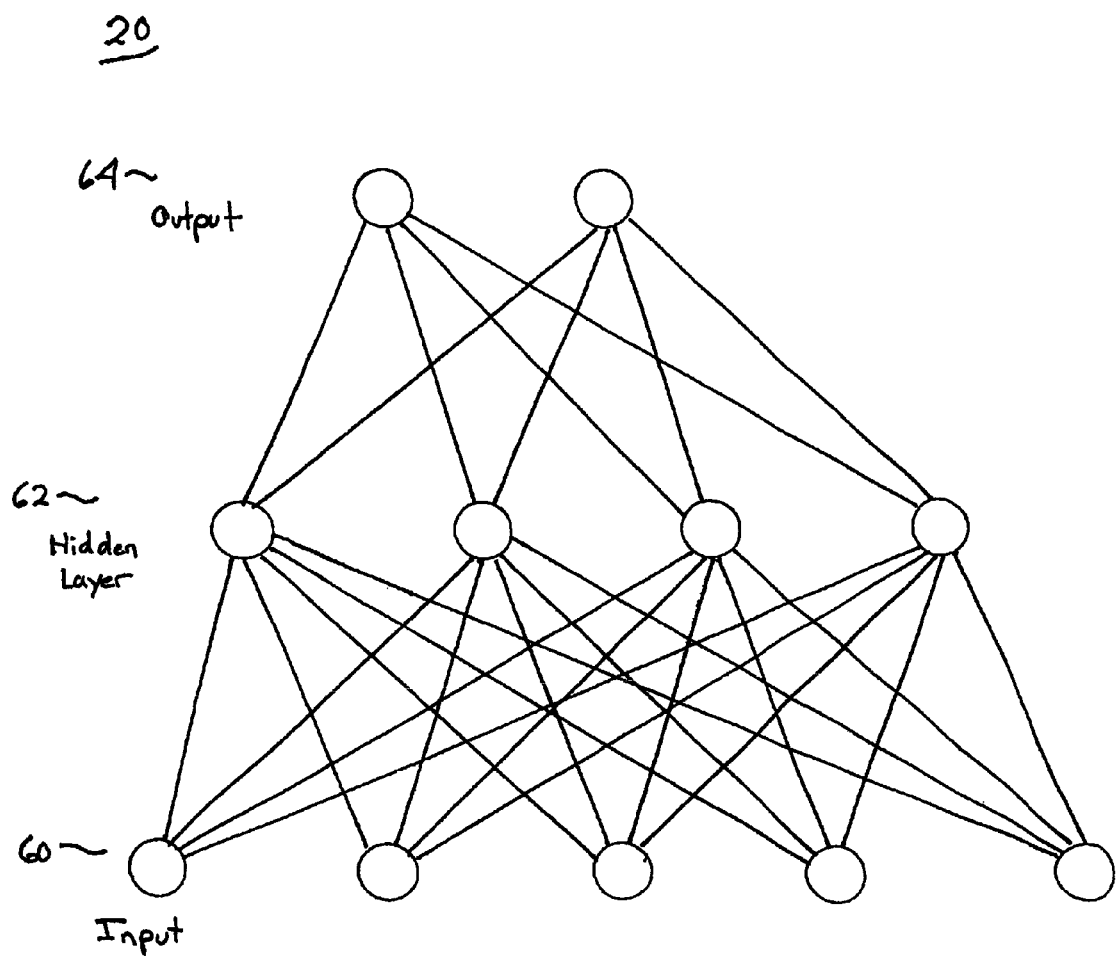
FIG. 2 is a diagram of a neural network model such as the neural network in the system of FIG. 1.

FIG. 2 is a diagram of the readability engine 20. In a first embodiment of the present invention, the readability engine is a Clauseau engine implemented in the form of an artificial neural net. It is, however, possible to implement the Clauseau engine in a form other than a neural net. A neural net may be generally defined as a system composed of a plurality of simple processing elements operating in parallel whose function is determined by network structure, connection strengths, and the processing performed at the computing elements or nodes (the "hidden" layer).

In the present embodiment of the invention, the neural net is a three layer neural net with an input layer 60, a "hidden" layer 62 and an output layer 64. Each layer has at least one connection to every element of the next layer(s). The neural net trains itself to identify phrases in the parsed text. The neural net begins with starting data of punctuation and functions words stored in the library. On the basis of the starting data, the neural net determines "phrases" in the text as it examines parsed words. The neural net then examines the "phrases" for further identifying characteristics of phrases. The characteristics found by the neural net are stored in the library.

Neural networks are useful for classification and function approximation and mapping problems which are tolerant to some imprecision and have a large quantity of training data, but to which rigid rules cannot easily be applied. A neural network can be trained to be a consistent estimator of binary classifications, i.e. to take in text data and to determine if there is, or is not a break.

Figure 3:
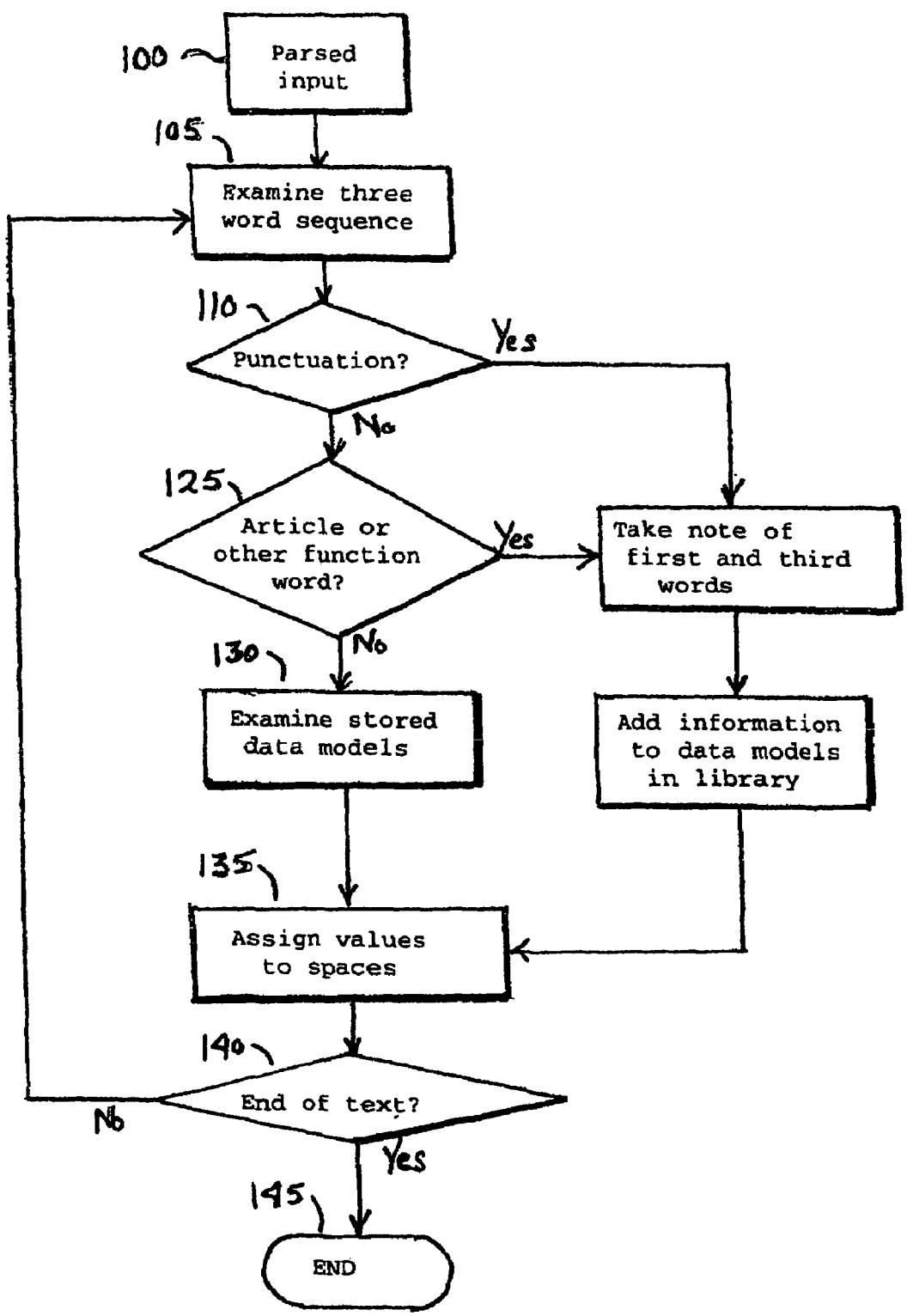
FIG. 3 is a flow chart of the operation of the neural network shown in FIG. 2; and, FIG. 4 is a flow chart of the operation of the present invention.

FIG. 3 is a flow chart of the operation of the Clauseau engine. The Clauseau engine takes text from the parser and examines a sequence of three words at a time, moving from left to right. The Clauseau engine trains on the text and extracts patterns and assigns values and builds a file of weights and connections. The weights and connections are stored in the library along with other formatting rules that will be described below.

The Clauseau engine is a 3-layer connectionist model, as described above, that has an installed input vocabulary of function words and punctuation data that are stored in the library. The Clauseau engine takes text from the parser as input, block 100. The Clauseau engine examines a sequence of three words of text at a time, moving from left to right, block 105. The Clauseau engine learns to predict whether the second of the three word sequence does or does not end a sentence. Because the end of every sentence is also the end of a phrase, the trained model of the Clauseau engine generalizes to predict phrase boundaries within sentences. After taking in the three word sequence, the Clauseau engine examines the second word for punctuation, block 110. If it finds punctuation, it knows that the second word is the end of a sentence in the case of a period, question mark, or exclamation point or the end of a phrase in the case of a comma or semi-colon. The Clauseau engine takes note of the first word or second word in the sequence, block 115, and adds the information to the data models in the library, block 120. By examining the words before and after the end of a sentence or phrase and adding information to the library, the system trains itself to recognize phrase breaks. Alternative methods of analyzing text include examining the text for periods and capitals in order to determine the beginnings and ends of sentences.

If the Clauseau engine finds no punctuation, then the Clauseau engine looks for an article or stored function word indicating the beginning or end of a phrase or sentence, block 125. If the Clauseau engine finds an article or function word, it takes note of the first and third word in the sequence, block 115, and adds the information to the data models in the library, block 120. If the Clauseau engine finds no article or function word as the second word of the sequence, it examines the data models for phrase data, block 130. Based on the outcome of the examination of the three word sequence, the Clauseau engine assigns values to the spaces between the words. The value assigned is the likelihood that the word is the beginning or end of a phrase.

If the Clauseau engine has not reached the end of the text, block 140, it examines the next three word sequence, overlapping the current three word sequence, and the process continues as described above. If it has reached the end of the text, the process stops, block 145.

Figure 4:
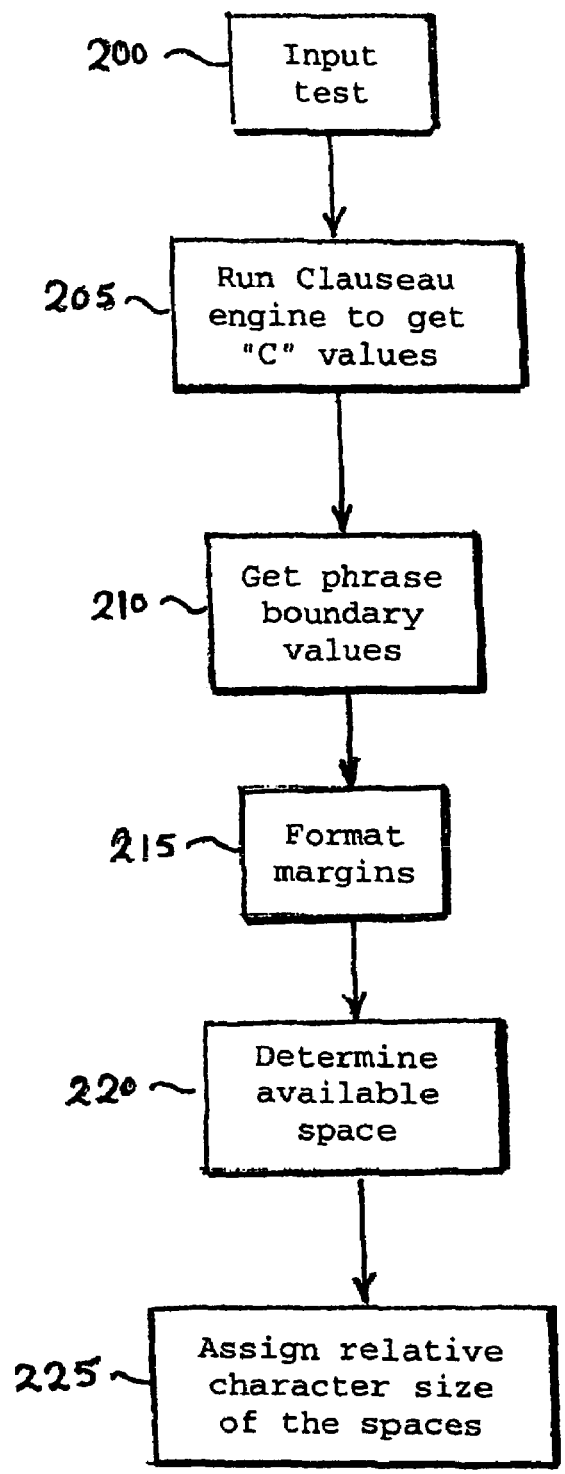

FIG. 4 is a flow chart of the operation of the present invention in formatting text in order to optimize readability. The system takes text as input, box 200. In the present embodiment, the unformatted text is ASCII text however, the invention could be practiced on other types of text.

The text input is parsed by the system. The system is a neural network-based. The neural network trains on text and extracts patterns and assigns values which will later be used to determine text arrangement for optimal readability.

The system analyzes the text by running a Clauseau engine, box 205. The neural network trains on text and extracts patterns and assigns values and builds up a library of weights and connections as described above with reference to FIG. 3. This information is used to control the size of the space between phrases as described below. The system assigns a likelihood to any given point between words being a beginning or end of a phrase.

After the Clauseau engine has been run, phrase boundary values are applied, box 210. The "Clauseau" values ("C"

values) are used to determine whether a phrase break is a phrase boundary and whether it is an end-of-sentence. The values range from 0-3, where "3" indicates and end-of-phrase punctuation, "2" indicates a major phrase break, "1" indicates a minor phrase break and "0" is assigned to all other breaks. The relative change in C values indicates phrase boundaries. A large change indicates a major phrase boundary.

Once the phrase boundaries have been established, the text margins are formatted, box 215. Margin formatting begins at the bottom of the text. The text is formatted line by line from the last line to the first line. Margin formatting has the following input options. The first option is the weight of aesthetic factors vs. phrase break factors. This controls whether to maximize aesthetics or maximize phrase-break values of line endings. The aesthetic score is affected by the anti-loose vs. anti jagged factor and anti-loose vs. anti-sloped factors. There are certain formatting rules that are straightforward to apply. For example if a line ends with the word "the," there is a low probability that it is the end of a phrase. The word "the" is usually promoted to the next line.

Window size or page height, page width and page margins are other input options. A margin-fitting macro analyzes each paragraph line-by-line with a purpose of making best use of line breaks to delineate phrase-boundaries given user-selected aesthetic constraints. The analysis takes as input a current break and determines potential adjacent breaks created by promoting a word or words onto the next line. The results of determining the locations of potential breaks with regard to the current break are compared to the number of lines in the paragraph that end in phrase breaks and the number of lines that interrupt phrase breaks in the paragraph.

After the margins have been formatted, the space available in each line is determined, block 220.

After the available space has been determined, the system assigns relative sizes to the spaces, block 225, based on the phrase boundary values and the available space in the line.

The present invention could also be applied to text in order to improve publishing economies without sacrificing readability. The rules in library 25 would, in this case, further include rules on text spacing enabling a work to be published as compactly as possible. In combination with the readability rules the present invention can improve publishing costs while at least maintaining, if not improving, readability.

The method and apparatus of the present invention may also be implemented using an expert system as the readability engine 20 with templates and rules in the library 25. A neural net may be employed to develop the library contents. The rules in the expert system would include a first set of rules for document layout and a second set of rules for readability and templates for applying the first and second sets of rules both alone and in combination in order to achieve a document formatted according to desired parameters.

An example of a constraint that may be applied using the present invention is keeping paragraphs to the same number of lines as before the algorithm was applied. A second constraint is that there be a minimum variation in print density from one line to the next. That is, it is desirable to avoid only a few words with wide spaces in one line and many words with small spaces in the next line.

The overall analysis for a paragraph has two basic steps. First, the method determines how many times line breaks conform to phrase boundary breaks. Second, the method determines how much text density varies from line to line. The second aspect can be done without regard to phrase analysis. The process could also allow weighing the phrasing aspect against the aesthetic aspects of maintaining phrase density.

A third constraint is the constraint against rivers in the text. Rivers are areas of white space created by the coincidence of spaces from line to line in printed text. A similar spacing pattern, from line to line, creates rivers. The system detects rivers and manipulates the text display until the white space is varied to a predetermined degree from line to line in order the eliminate the river. In the present embodiment, rivers are detected by one of two ways. Using the first method, the printed text is analyzed by computer vision for vertical spaces that continue for more than two lines of text. In the second method, the system analyzes the printed file for spaces of a predetermined size aligned with spaces of the same predetermined size or larger. When an aligned space is detected by either method, the system determines that there is a river in the text at the lines being examined. The system first attempts to realign the second line in the detected river. If realignment of the second line is not possible or if it does not eliminate the river, the system attempts to realign the first line and then the third line of the detected river.

Aspects of the physical page that can be controlled in order to improve readability and to affect publishing economies, in addition of text spacing, are print darkness, spacing between lines, fonts, font size, font color, background shading, background color, column width and column spacing, leading, kerning, paragraph indentation, and page margins. Examples of the applications of these formatting aspects are as follows. In leading, a default rule would provide inter-paragraph leading equal to 120% of font size, and intraparagraph leading equal to 100%, for example. In order to maximize publishing economies, the leading could be 60% instead in both cases. For maximum readability the leading could be 180%, for example. In column width, a default rule (particularly in newspapers) could provide a width slightly less than that taken in by the eye when the paper is held at arm's length, 3.75" for example. Publishing economies might take this up to 4.5". For material that is aimed at poor readers, or those with bad eyesight, the width could be reduced to 2.25". For books, the width could be some multiple of these figures, 7.5", 9.0", 4.5" etc. In the case of font size, font size may be varied with considerable precision. Poor readers may require a font size of 14 or more. As publishing economies become important the font size could be decreased in ¼-point decrements, down to a lower limit of 8 for example. For kerning, there could be some limit set on minimal possible kerning in relation to font size, for example kerning never to be set below 80% of normal spacing for a font size except for certain letter combinations (i and e, a and e for example). Any type of font may be used depending on the desired parameters of the document. For example, a particular font may be useful in relation to a particular reading problem, such as dyslexia. The relation between font and font size for readability will determine how font size is used to effect publishing economies. For example, Ariel at 9.5 is found to be as easy to read as Times New Roman at 11 or Century at 13. Publishing economies will dictate use of the font which has best readability at the lowest font size. In the case of paragraph indentation, readability is helped if the first line of all paragraphs are indented by a significant ratio of overall paragraph width, for example by 15%. Publishing economies would prefer no indent. Background color is a key parameter in web page design. White becomes hard on the eyes after a time. Soft colors, dull green, yellow or light blue are easier. In the case of font color, font color would be selected to contrast with background color. After an optimal column width is determined, page size can be determined by some multiple of that, along with column margins and page margins. The choice of page size will affect the number of pages, thus the number of signatures for printing, press time and binding.

The present invention also produces text having similar density throughout the printed material. This includes the minimization of the occurrence of rivers in the document, optimization of leading, that is, the space between lines of text, to optimize variations in the shape of letters and the density with which they are printed.

The present invention further includes a method for establishing optimal spacing. In addition, formatting rules can determine all key parameters of page layout, including but not limited to such parameters as: line breaks and varying spaces within a line of text, column width, size of margins, font, font size, color, leading and kerning. These parameters may be adjusted to enhance readability according to the characteristics of the expected reader. Formatting rules may also be applied in such a way as to produce significant publishing economies by saving paper and other materials, reducing printing labor and press time, easing binding requirements, while generating text that is of equivalent or improved readability than text not formatted according to the present invention.

In an alternative embodiment of the invention, other characteristics of the print or text display including, for example, font size, may be varied in accordance with the known characteristics of a reader's visual system. A further alternative embodiment of the invention for presentation devices such as a cathode ray tube display or liquid crystal display, displays the text phrase by phrase, or word by word with temporal spacing at phrase boundaries, as analyzed by the present invention.

An application of the present invention is closed-captioning. Currently, words are presented without being grouped in a manner which would assist their comprehension. A person with a stenography machine types in words and the computer looks up the words. "The" and other simple words are looked up quickly and therefore presented on the screen quickly, however longer or unfamiliar words are slow to look up and there is a long pause after the beginning of a phrase and the rest of the phrase. Also, the ends of lines tend to be words that are beginning phrase words. The present invention enhances the operation of a closed-captioning system by identifying phrases which are then presented as a unit to be read.

One of ordinary skill in the art of computerized text formatting will appreciate that the inventive method described herein can be readily incorporated into a word processing system or a page layout system or would interface with such systems. Formatting could alternatively take place at the printing step using a printer having a program to effect the formatting scheme output from the present invention.

The rules of the formatting system of the present invention could be constrained by the expected capabilities of the reader toward which the text is directed, by aesthetic considerations, by publishing economics concerns, and by the goal of optimizing readability.

Applications of the present invention include formatting for educational materials, books in general, magazines, direct mail literature, and web pages.

The present invention may be implemented in a user-variable manner in, for example, a Web page or potentially an e-book or some other type of variable environment. In this embodiment, the reading level of the user and the complexity of the text control the weights given to phrase-based rules used in the system. The more difficult a text is for a particular reader, the greater the phrase-based weightings. The user selects a reading level and the text is formatted according to the read-level applicable formatting rules.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for determining phrasing in text, comprising the steps of:
   a) providing text input;
   b) providing a library of key words and punctuation definitions that identify the beginning or end of a phrase;
   c) using said key words and punctuation definitions to determine characteristics that predict phrase or sentence boundaries;
   d) examining a plurality of words of said text input;
   e) using said determined characteristics to predict phrase boundaries within said plurality of words; and
   f) repeating steps d-e for a next plurality of words until phrase boundaries are predicted for each between word space in the text input.

2. The method of claim 1, wherein the characteristics predict boundary punctuation.

3. The method of claim 1, wherein the characteristics include a pattern of key and non-key words, further comprising between steps d and e:
   identifying each word of said plurality as one of the key words in the library or a non-key word; and
   extracting a pattern from said plurality of the key and non-key words, and then using the pattern to predict phrase boundaries for each between word space within said plurality of words.

4. The method of claim 1, further comprising:
   assigning a value to each predicted phrase boundary equal to the likelihood that the predicted phrase boundary is the beginning or end of a phrase.

5. The method of claim 1, wherein the phrase boundaries are predicted using a neural network.

6. The method of claim 5, wherein the neural network comprises a Clauseau readability engine.

7. The method of claim 5, wherein the neural network provides the library of key words and punctuation definitions.

8. The method of claim 1, further comprising:
   processing the text input according to the predicted phrase boundaries.

9. A system for determining phrasing in text, comprising:
   a library for storing key words and punctuation definitions;
   a parser for parsing text input; and
   a neural network using the key words and punctuation definitions to predict phrase boundaries at between word spaces in the parsed text input.

10. A system for determining phrasing in text, comprising:
    a library for storing key words and punctuation definitions;
    a parser for parsing text input into sections containing within-sentence boundaries, said sections being represented as input patterns of key and non-key words; and a neural network using the key words and punctuation definitions to process the input patterns to predict phrase boundaries at between word spaces within sentences in the parsed text input.

11. The system of claim 10, wherein the neural network is trained on sections of training text less punctuation that cross phrase or sentence boundaries and represented as test patterns of key and non-key words to predict boundary punctuation at the end of phrases or sentences.

12. A system for determining phrasing in text, comprising:
a library for storing key words and punctuation definitions;
a parser for parsing text input; and
a neural network using the key words and punctuation definitions to assign values to predicted phrase boundaries at between word spaces in the parsed text, said assigned value being the likelihood that the word preceding the space ends a phrase and the word following the space begins a phrase.

13. The system of claim 12, wherein the neural network assigns a value to every between word space in the text input.

14. A system for determining phrasing in text, comprising:
a library for storing text elements including key words and/or punctuation definitions that identify phrase boundaries;
a neural network extricating patterns from training text input to determine key words and/or punctuation definitions for the library and to train the neural network to identify phrase boundaries; and
a parser for parsing text input,
said trained neural network using the text elements to extricate patterns in the parsed text input to predict phrase boundaries at between word spaces in the parsed text input.

15. The system of claim 14, wherein said parser parses the text input into sections represented as input patterns based on said text elements and passes the input patterns to the neural network.

16. The system of claim 15, wherein said parser parses the text input into sections containing within-sentence boundaries, said sections being represented as input patterns of text elements and non-text elements.

17. A system for determining phrasing in text, comprising:
a library for storing text elements including key words and/or punctuation definitions;
a parser for parsing text input into sections containing within-sentence boundaries, said sections being represented as input patterns of text elements; and
a neural net readability engine trained on sections of training text that cross phrase or sentence boundaries and represented as test patterns of text elements to predict boundaries, said neural net processing the input patterns to assign values to predicted phrase boundaries within sentences.

18. The system of claim 17, wherein the neural network assign values to between word spaces in the input patterns, said assigned value being the likelihood that the word preceding the space ends a phrase and the word following the space begins a phrase.

19. The system of claim 18, wherein the neural network assigns a value to every between word space in the text input.

20. The system of claim 17, wherein the neural network assigns a value to every between word space in the text input.

21. The system of claim 17, further comprising:
a processor configured to process the text input according to the predicted phrase boundaries.

* * * * *